US011292307B2

(12) United States Patent
Du et al.

(10) Patent No.: US 11,292,307 B2
(45) Date of Patent: Apr. 5, 2022

(54) SUSPENSION FAULT DIAGNOSTICS AND PROGNOSTICS USING PITCH AND ROLL MODEL

(71) Applicant: GM GLOBAL TECHNOLOGY OPERATIONS LLC, Detroit, MI (US)

(72) Inventors: Xinyu Du, Oakland Township, MI (US); Mutasim A. Salman, Rochester Hills, MI (US); Lichao Mai, Sterling Heights, MI (US); Brian K. Saylor, South Lyon, MI (US); Kevin A. Cansiani, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 254 days.

(21) Appl. No.: 16/578,911

(22) Filed: Sep. 23, 2019

(65) Prior Publication Data

US 2021/0086576 A1    Mar. 25, 2021

(51) Int. Cl.
*B60G 17/015*   (2006.01)
*G07C 5/08*     (2006.01)

(52) U.S. Cl.
CPC ......... *B60G 17/015* (2013.01); *G07C 5/0808* (2013.01); *B60G 2400/0511* (2013.01); *B60G 2400/0512* (2013.01); *B60G 2400/0521* (2013.01); *B60G 2400/104* (2013.01); *B60G 2400/106* (2013.01); *B60G 2800/012* (2013.01); *B60G 2800/014* (2013.01); *B60G 2800/802* (2013.01)

(58) Field of Classification Search
CPC .......... B60G 17/015; B60G 2400/0511; B60G 2400/0512; B60G 2400/0521; B60G 2400/104; B60G 2400/106; B60G 2800/012; B60G 2800/014; B60G 2800/802; G07C 5/0808
See application file for complete search history.

(56) References Cited

U.S. PATENT DOCUMENTS

| | | | |
|---|---|---|---|
| 2007/0067080 A1* | 3/2007 | Messih | B60T 8/172 701/37 |
| 2008/0059021 A1* | 3/2008 | Lu | B60G 17/0195 701/36 |
| 2011/0130915 A1* | 6/2011 | Wright | G01M 17/007 701/29.6 |
| 2020/0089250 A1* | 3/2020 | Marble | B60Q 9/00 |

* cited by examiner

*Primary Examiner* — Hunter B Lonsberry
*Assistant Examiner* — Daniel L Greene
(74) *Attorney, Agent, or Firm* — Lorenz & Kopf LLP

(57) ABSTRACT

In various embodiments, methods, systems, and vehicles are provided for determining a fault in a suspension system of a vehicle. In an exemplary embodiment, sensor data is obtained via one or more vehicle sensors during operation of the vehicle; a one or more first coefficients for the vehicle are calculated via a processor using a pitch model with the sensor data; one or more second coefficients for the vehicle are calculated via the processor using a roll model with the sensor data; and a fault in the suspension system is determined via the processor using the first coefficients and the second coefficients.

6 Claims, 7 Drawing Sheets

50: Operating environment
52: Remote transportation system
54: User devices
60: Wireless carrier system
62: Land communication system
64: Satellite carrier system 28: Sensor
30: Actuator
34: Controller
70: Autonomous driving
74: Computer vision
76: Positioning
78: Guidance
80: Vehicle control
400: Suspension control 400: Suspension control
410: Detection
412: Processing
415: Observational data
420: Processing module
425: Instructions

SUSPENSION FAULT DIAGNOSTICS AND PROGNOSTICS USING PITCH AND ROLL MODEL

TECHNICAL FIELD

The present disclosure generally relates to vehicles, and more particularly relates to systems and methods for diagnosing and prognosticating suspension faults in vehicles.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

In certain circumstances it may be desirable for improved detection and prognostication in suspension faults for vehicles, including autonomous vehicles (e.g., in which there is not a driver who can readily detect differences in suspension).

Accordingly, it is desirable to provide systems and methods for detecting and prognosticating suspension faults in vehicles, such as autonomous vehicles. Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method for determining a fault in a suspension system of a vehicle includes: obtaining sensor data via one or more vehicle sensors during operation of the vehicle; calculating, via a processor, one or more first coefficients for the vehicle, using a pitch model with the sensor data; calculating, via the processor, one or more second coefficients for the vehicle, using a roll model with the sensor data; and determining, via the processor, the fault in the suspension system using the first coefficients and the second coefficients.

Also in one embodiment, the sensor data pertains to a longitudinal acceleration and a pitch angle for the vehicle; and the step of calculating the one or more first coefficients includes calculating the one or more first coefficients, via the pitch model, using the longitudinal acceleration and the pitch angle.

Also in one embodiment, the step of calculating the one or more first coefficients includes calculating a stiffness coefficient, via the pitch model, using the longitudinal acceleration and the pitch angle; and the step of determining the fault includes determining a fault in a spring of the suspension system, when the stiffness coefficient exceeds a predetermined threshold.

Also in one embodiment, the step of calculating the one or more first coefficients includes calculating a damping coefficient, via the pitch model, using the longitudinal acceleration and the pitch angle; and the step of determining the fault includes determining a fault in a damper of the suspension system, when the damping coefficient is less than a predetermined threshold.

Also in one embodiment, the sensor data pertains to a lateral acceleration and a roll angle for the vehicle; and the step of calculating the one or more second coefficients includes calculating the one or more second coefficients using the longitudinal acceleration and the yaw rate.

Also in one embodiment, the step of calculating the one or more second coefficients includes calculating a stiffness coefficient, via the roll model, using the lateral acceleration and the roll angle; and the step of determining the fault includes determining a fault in a stabilizing bar of the suspension system, when the stiffness coefficient is less than a predetermined threshold.

Also in one embodiment, the sensor data pertains to a longitudinal acceleration, a pitch angle, a lateral acceleration, and a roll angle for the vehicle; the step of calculating the one or more first coefficients includes calculating a first stiffness coefficient and a damping coefficient, via the pitch model, using the longitudinal acceleration and the pitch angle; the step of calculating the one or more second coefficients includes calculating a stiffness coefficient, via the roll model, using the lateral acceleration and the roll angle; and the step of determining the fault includes: determining a fault in a spring of the suspension system, when the first stiffness coefficient exceeds a first predetermined threshold; determining a fault in a damper of the suspension system, when the damping coefficient is less than a second predetermined threshold; and determining a fault in a stabilizing bar of the suspension system, when the roll stiffness coefficient is less than a third predetermined threshold.

In another exemplary embodiment, a system is provided that includes: one or more sensors configured to generate sensor data during operation of the vehicle; and a processor coupled to the sensors and configured to at least facilitate: calculating one or more first coefficients for the vehicle, using a pitch model with the sensor data; calculating one or more second coefficients for the vehicle, using a roll model with the sensor data; and determining a fault in a suspension system of the vehicle using the first coefficients and the second coefficients.

Also in one embodiment, the sensor data pertains to a longitudinal acceleration and a pitch angle for the vehicle; and the processor is further configured to at least facilitate calculating the one or more first coefficients, via the pitch model, using the longitudinal acceleration and the pitch angle.

Also in one embodiment, the processor is further configured to at least facilitate: calculating a stiffness coefficient, via the pitch model, using the longitudinal acceleration and the pitch angle; and determining a fault in a spring of the suspension system, when the stiffness coefficient exceeds a predetermined threshold.

Also in one embodiment, the processor is further configured to at least facilitate: calculating a damping coefficient, via the pitch model, using the longitudinal acceleration and the pitch angle; and determining a fault in a damper of the suspension system, when the damping coefficient is less than a predetermined threshold.

Also in one embodiment, the sensor data pertains to a lateral acceleration and a roll angle for the vehicle; and the processor is further configured to at least facilitate calculating the one or more second coefficients using the lateral acceleration and the roll angle.

Also in one embodiment, the processor is further configured to at least facilitate: calculating a stiffness coefficient, via the roll model, using the lateral acceleration and the roll angle; and determining a fault in a stabilizing bar of the suspension system, when the stiffness coefficient is less than a predetermined threshold.

In another exemplary embodiment, a vehicle includes: a suspension system; one or more sensors configured to generate sensor data during operation of the vehicle; and a processor coupled to the sensors and configured to at least facilitate: calculating one or more first coefficients for the vehicle, using a pitch model with the sensor data; calculating one or more second coefficients for the vehicle, using a roll model with the sensor data; and determining a fault in the suspension system using the first coefficients and the second coefficients.

Also in one embodiment, the sensor data pertains to a longitudinal acceleration and a pitch angle for the vehicle; and the processor is further configured to at least facilitate calculating the one or more first coefficients, via the pitch model, using the longitudinal acceleration and the pitch angle.

Also in one embodiment, the processor is further configured to at least facilitate: calculating a stiffness coefficient, via the pitch model, using the longitudinal acceleration and the pitch angle; and determining a fault in a spring of the suspension system, when the stiffness coefficient exceeds a predetermined threshold.

Also in one embodiment, the processor is further configured to at least facilitate: calculating a damping coefficient, via the pitch model, using the longitudinal acceleration and the pitch angle; and determining a fault in a damper of the suspension system, when the damping coefficient is less than a predetermined threshold.

Also in one embodiment, the sensor data pertains to a lateral acceleration and a roll angle for the vehicle; and the processor is further configured to at least facilitate calculating the one or more second coefficients using the lateral acceleration and the roll angle.

Also in one embodiment, the processor is further configured to at least facilitate: calculating a stiffness coefficient, via the roll model, using the lateral acceleration and the roll angle; and determining a fault in a stabilizing bar of the suspension system, when the stiffness coefficient is less than a predetermined threshold.

Also in one embodiment, the sensor data pertains to a longitudinal acceleration, a pitch angle, a lateral acceleration, and a roll angle for the vehicle; and the processor is further configured to at least facilitate: calculating a first stiffness coefficient and a damping coefficient, via the pitch model, using the longitudinal acceleration and the pitch angle; calculating a stiffness coefficient, via the roll model, using the lateral acceleration and the roll angle; and determining a fault in a spring of the suspension system, when the first stiffness coefficient exceeds a first predetermined threshold; determining a fault in a damper of the suspension system, when the damping coefficient is less than a second predetermined threshold; and determining a fault in a stabilizing bar of the suspension system, when the roll stiffness coefficient is less than a third predetermined threshold.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
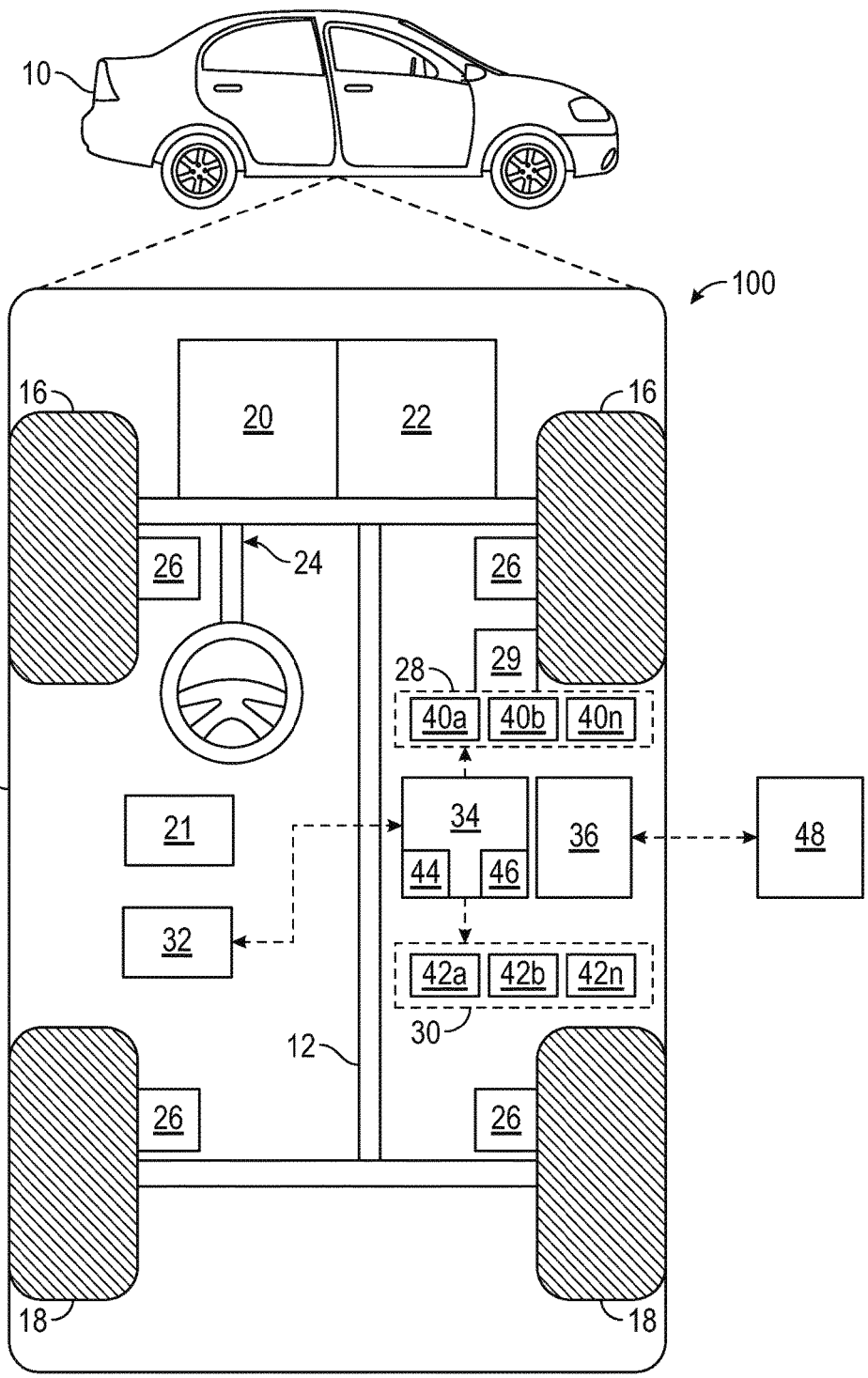
FIG. 1 is a functional block diagram illustrating a vehicle having a suspension control system, in accordance with various embodiments.

With reference to FIG. 1, a suspension control system shown generally as 100 is associated with a vehicle 10 (also referred to herein as a "host vehicle") in accordance with various embodiments. In general, the suspension control system (or simply "system") 100 provides planning for a corridor of travel for the vehicle 10 through a roadway that is shared with other vehicles (e.g., which may be referred to as "other vehicles" or "target vehicles" herein). For example, in various embodiments, the suspension control system 100 diagnoses and predicts faults in a suspension system 21 of the vehicle 10 using pitch and roll models, utilizing inputs obtained from sensors of an inertial measurement unit 29 of the vehicle 10, in various embodiments.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 comprise a wheel assembly that also includes respective associated tires.

In certain embodiments, the vehicle 10 is an autonomous vehicle, and the suspension control system 100, and/or components thereof, are incorporated into the vehicle 10. The vehicle 10 is, for example, a vehicle that is automatically controlled to carry passengers from one location to another. In certain other embodiments, the vehicle 10 may be a traditional/non-autonomous vehicle, for example controlled and/or driven by a human driver of the vehicle 10. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous, non-autonomous, or other vehicle that includes sensors and a suspension system.

As shown, the vehicle 10 generally includes a propulsion system 20, the above-referenced suspension system 21, a transmission system 22, a steering system 24, a brake system 26, one or more user input devices 27, a sensor system 28, an actuator system 30, at least one data storage device 32, at least one controller 34, and a communication system 36.

Figure 5:
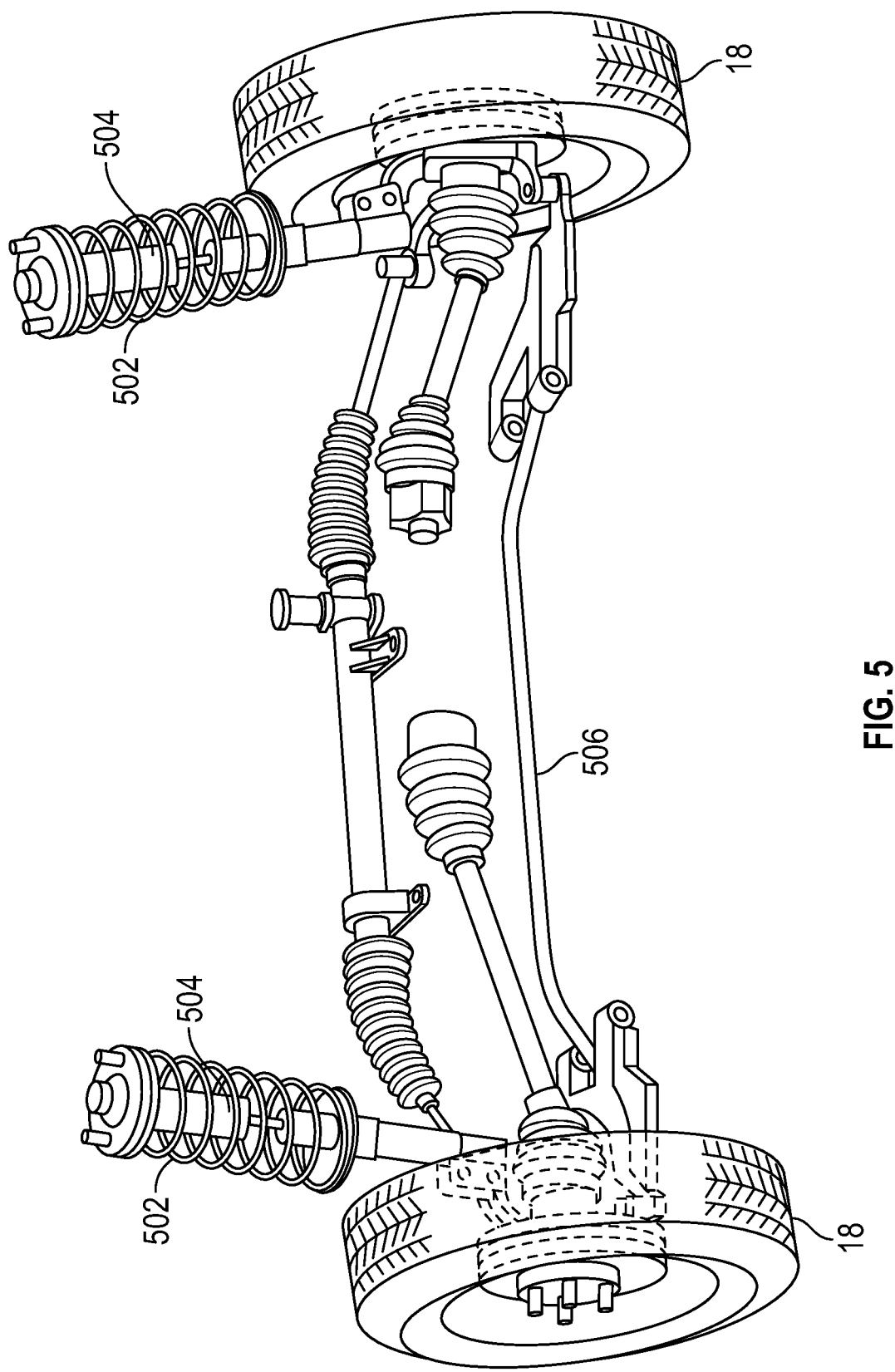
FIG. 5 is a schematic diagram of a suspension system of the vehicle of FIG. 1, and that is controlled by the suspension control system of FIG. 4, in accordance with various embodiments.

With reference to FIG. 5, in various embodiments the suspension system 21 includes a plurality of springs 502, a plurality of dampers 504, and one or more stabilizing bars 506. In certain embodiments, the suspension system 21 includes a respective spring 502 and damper 504 for each wheel 18 of the vehicle 10, and a respective stabilizing bar 506 between each pair of wheels 18 of the vehicle 10 (e.g., a first stabilizing bar 506 connected and/or otherwise coupled between a front pair of wheels 18, and a second stabilizing bar 506 and/or otherwise coupled between a rear pair of wheels 18, and so on, for example for a vehicle 10 with additional wheels 18).

With reference back to FIG. 1, the propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel for illustrative purposes, in some embodiments contemplated within the scope of the present disclosure, the steering system 24 may not include a steering wheel.

In various embodiments, one or more user input devices 27 receive inputs from one or more passengers of the vehicle 10. In various embodiments, the inputs include a desired destination of travel for the vehicle 10. In certain embodiments, one or more input devices 27 comprise an interactive touch-screen in the vehicle 10. In certain embodiments, one or more inputs devices 27 comprise a speaker for receiving audio information from the passengers. In certain other embodiments, one or more input devices 27 may comprise one or more other types of devices and/or may be coupled to a user device (e.g., smart phone and/or other electronic device) of the passengers, such as the user device 54 depicted in FIG. 2 and described further below in connection therewith).

The sensor system 28 includes one or more sensors 40a-40n that sense observable conditions of the exterior environment and/or the interior environment of the vehicle 10. The sensors 40a-40n include, but are not limited to, accelerometers, pitch sensors, roll sensors, yaw sensors, radars, lidars, global positioning systems, optical cameras, thermal cameras, ultrasonic sensors, inertial measurement units, and/or other sensors. In various embodiments, some or all of the sensors 40a-40n are part of the above-referenced inertial measurement unit 29 of the vehicle 10.

The actuator system 30 includes one or more actuators 42a-42n that control one or more vehicle features such as, but not limited to, the propulsion system 20, the transmission system 22, the steering system 24, and the brake system 26. In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. In various embodiments, the controller 34 (among various other control features for the vehicle 10 and/or components thereof) detects and predicts faults in the suspension system 21 using pitch and roll models, for example as described in greater detail further below in connection with the process 600 of FIG. 6 and the implementations depicted in FIGS. 7 AND 8 and described in greater detail further below in connection therewith.

The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media (also referred to herein as computer memory, or memory) 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Figure 2:
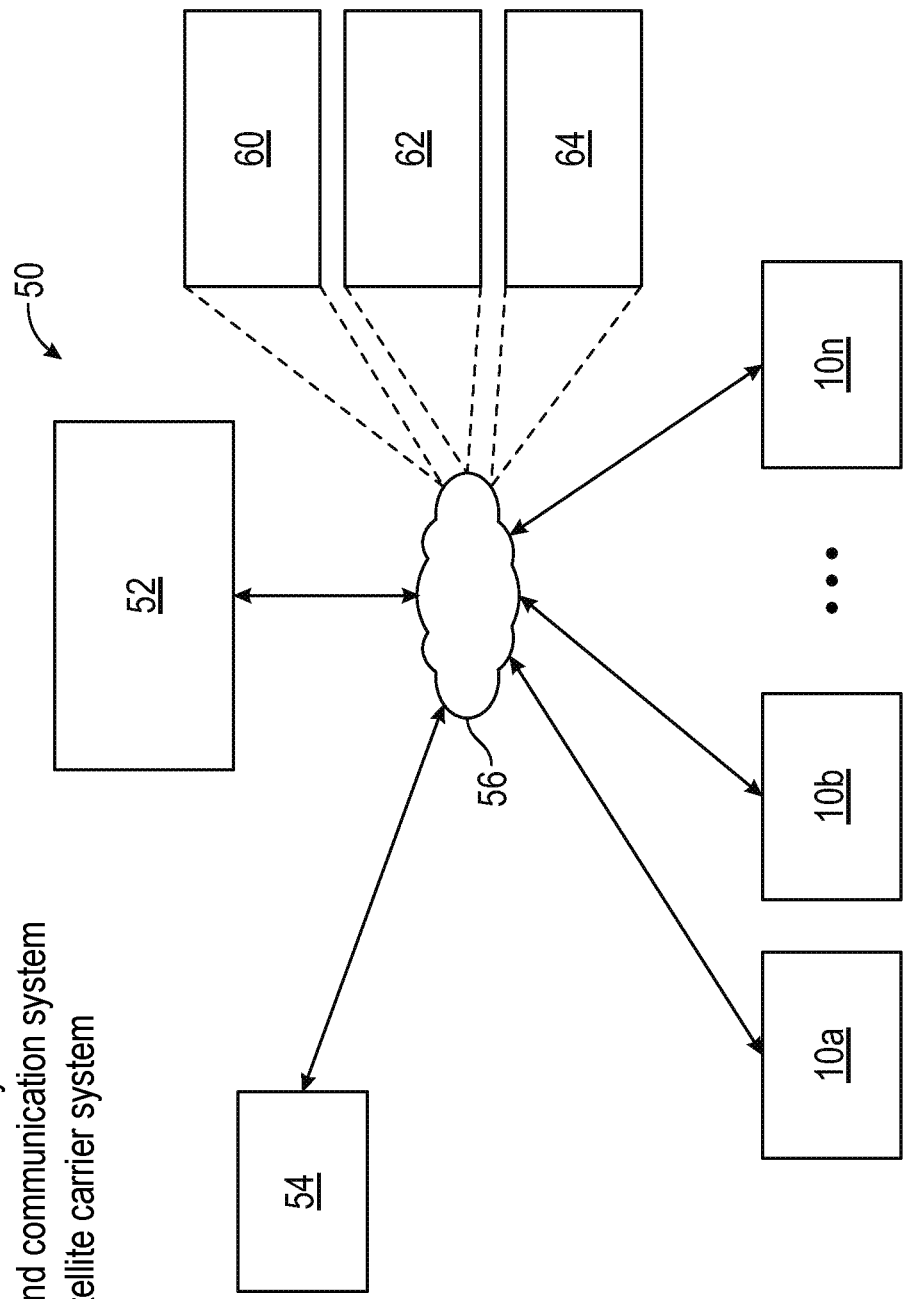
FIG. 2 is a functional block diagram illustrating a transportation system having one or more vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In certain embodiments, the communication system 36 is further configured for communication between the sensor system 28, the input device 27, the actuator system 30, one or more controllers (e.g., the controller 34), and/or more other systems and/or devices (such as, by way of example, the user device 54 depicted in FIG. 2 and described further below in connection therewith). For example, the communication system 36 may include any combination of a controller area network (CAN) bus and/or direct wiring between the sensor system 28, the actuator system 30, one or more controllers 34, and/or one or more other systems and/or devices. In various embodiments, the communication system 36 may include one or more transceivers for communicating with one or more devices and/or systems of the vehicle 10, devices of the passengers (e.g., the user device 54 of FIG. 2), and/or one or more sources of remote information (e.g., GPS data, traffic information, weather information, and so on).

With reference now to FIG. 2, in various embodiments, the vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more vehicles 10a-10n as described with regard to FIG. 1. In various embodiments, the operating environment 50 (all or a part of which may correspond to entities 48 shown in FIG. 1) further includes one or more user devices 54 that communicate with the vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the vehicles 10a-10n to schedule rides, dispatch vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline vehicle 10 and/or a vehicle based remote transportation system 52. To this end, a vehicle and vehicle based remote transportation system can be modified, enhanced, or otherwise supplemented to provide the additional features described in more detail below.

Figure 3:
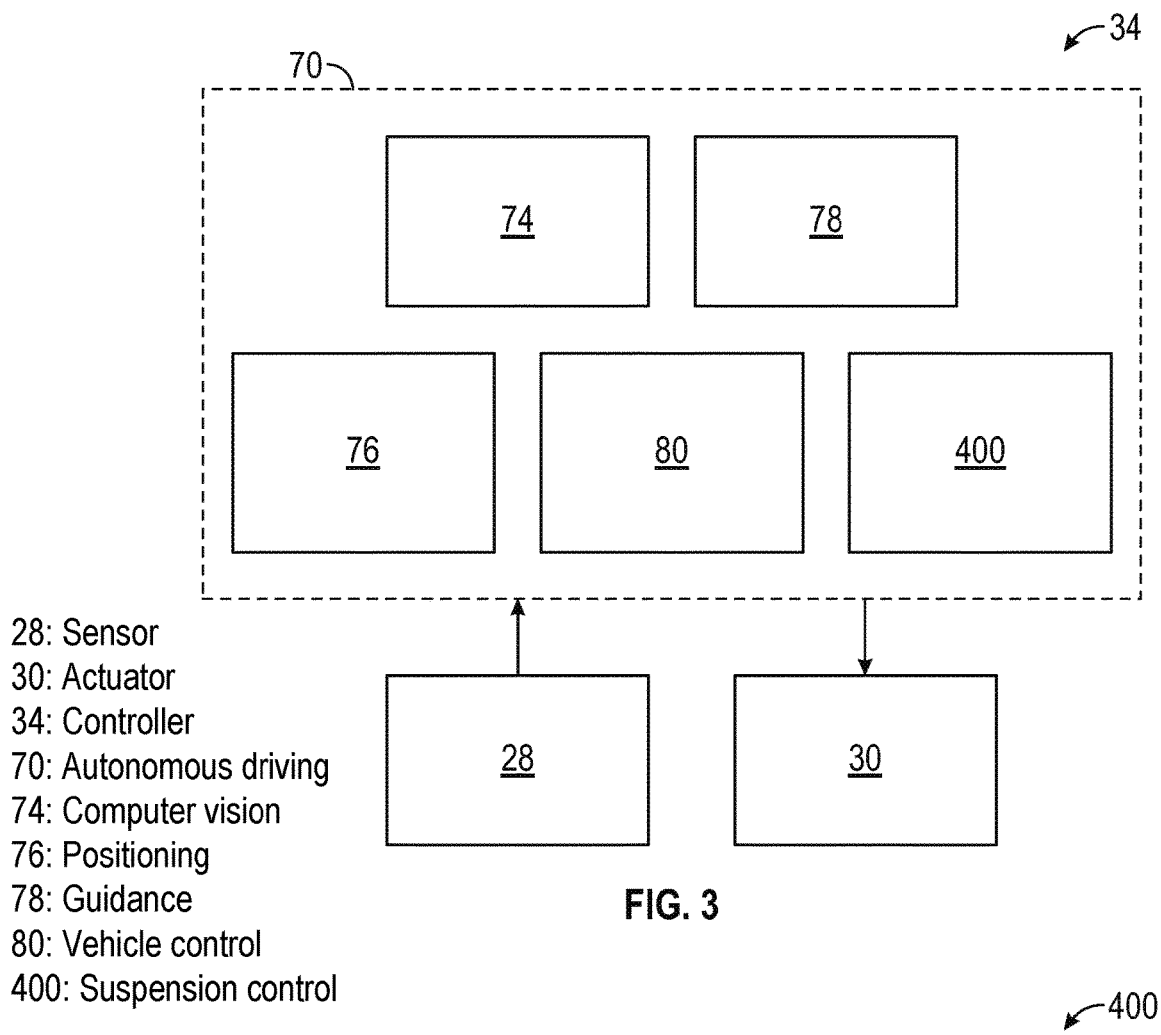
FIG. 3 is functional block diagram illustrating an autonomous driving system (ADS) having a suspension control system associated with the vehicle of FIG. 1, in accordance with various embodiments.

In accordance with various embodiments, the controller 34 implements an autonomous driving system (ADS) as shown in FIG. 3. That is, suitable software and/or hardware components of the controller 34 (e.g., processor 44 and computer-readable storage device 46) are utilized to provide an ADS that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, and the like) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, as discussed above with regard to FIG. 1, one or more instructions of the controller 34 are embodied in the suspension control system 100, for detecting and predicting faults in the suspension system 21 of FIG. 1. All or parts of the suspension control system 100 may be embodied in the computer vision system 74, and/or the vehicle control system 80 or may be implemented as a separate system (referred to as a suspension control system 400), as shown.

Figure 4:
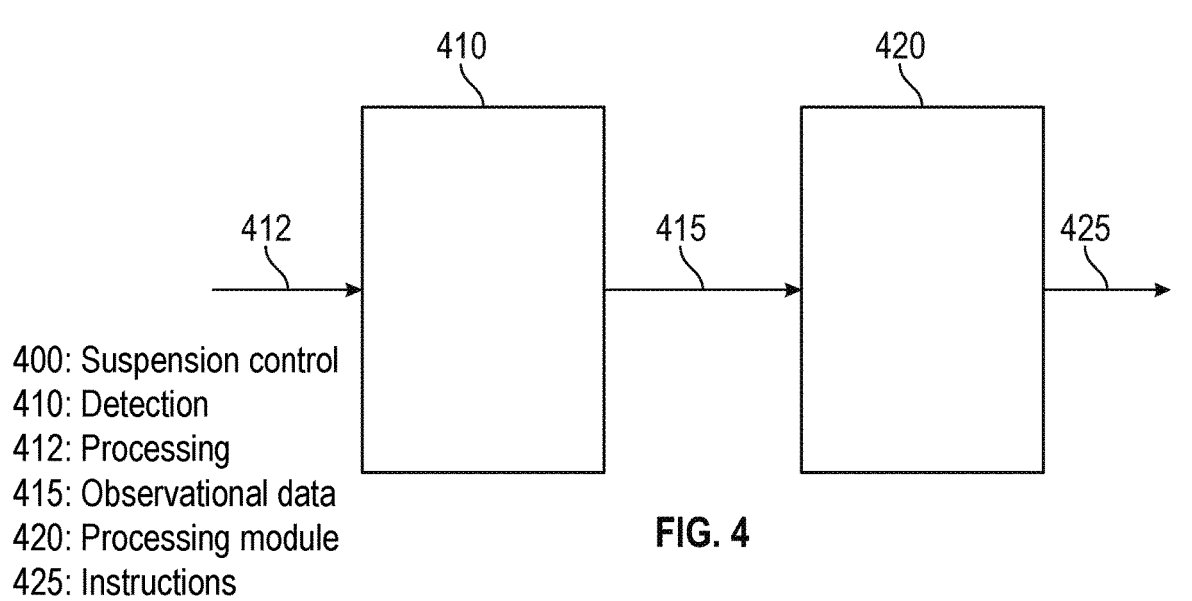
FIG. 4 is a functional block diagram illustrating the suspension control system, in accordance with various embodiments.

Referring to FIG. 4 and with continued reference to FIG. 1, the suspension control system 400 generally includes a detection module 410 and a processing module 420. In various embodiments, the detection module 410 and the processing module 420 are disposed onboard the vehicle 10. As can be appreciated, in various embodiments, parts of the suspension control system 400 may be disposed on a system remote from the vehicle 10 while other parts of the suspension control system 400 may be disposed on the vehicle 10.

In various embodiments, the detection module 410 receives sensor data 412 from various sensors 40a-40n of the vehicle 10 (e.g., sensors 40 that are part of the IMU 29 of the vehicle 10, such as accelerometers, yaw sensors, pitch sensors, and roll sensors, and so on). The detection module 410 gathers the sensor data 412 in order to obtain information pertaining to the lateral and longitudinal accelerations of the vehicle 10, and the pitch and roll angles for the vehicle 10, under various conditions (e.g., as described further below in connection with FIGS. 6-9). In various embodiments, the detection module 410 gathers this sensor information and generates observational data 415 as outputs for the detection module 410, which are provided to the processing module 420 described below.

The processing module 420 receives the observational data 415 from the detection module 410, performs analysis using the received observational data 415, including the diagnosing and predicting of faults for the suspension system 21 of FIG. 1 (for example as described in greater detail further below in connection with FIGS. 6-9). Also in various embodiments, the processing module 420 generates instructions 425 as appropriate for operation of the vehicle 10 based on the determinations (e.g., for requesting service for the suspension system 21, and/or tuning the suspension system 21, and so on).

Figure 6A:
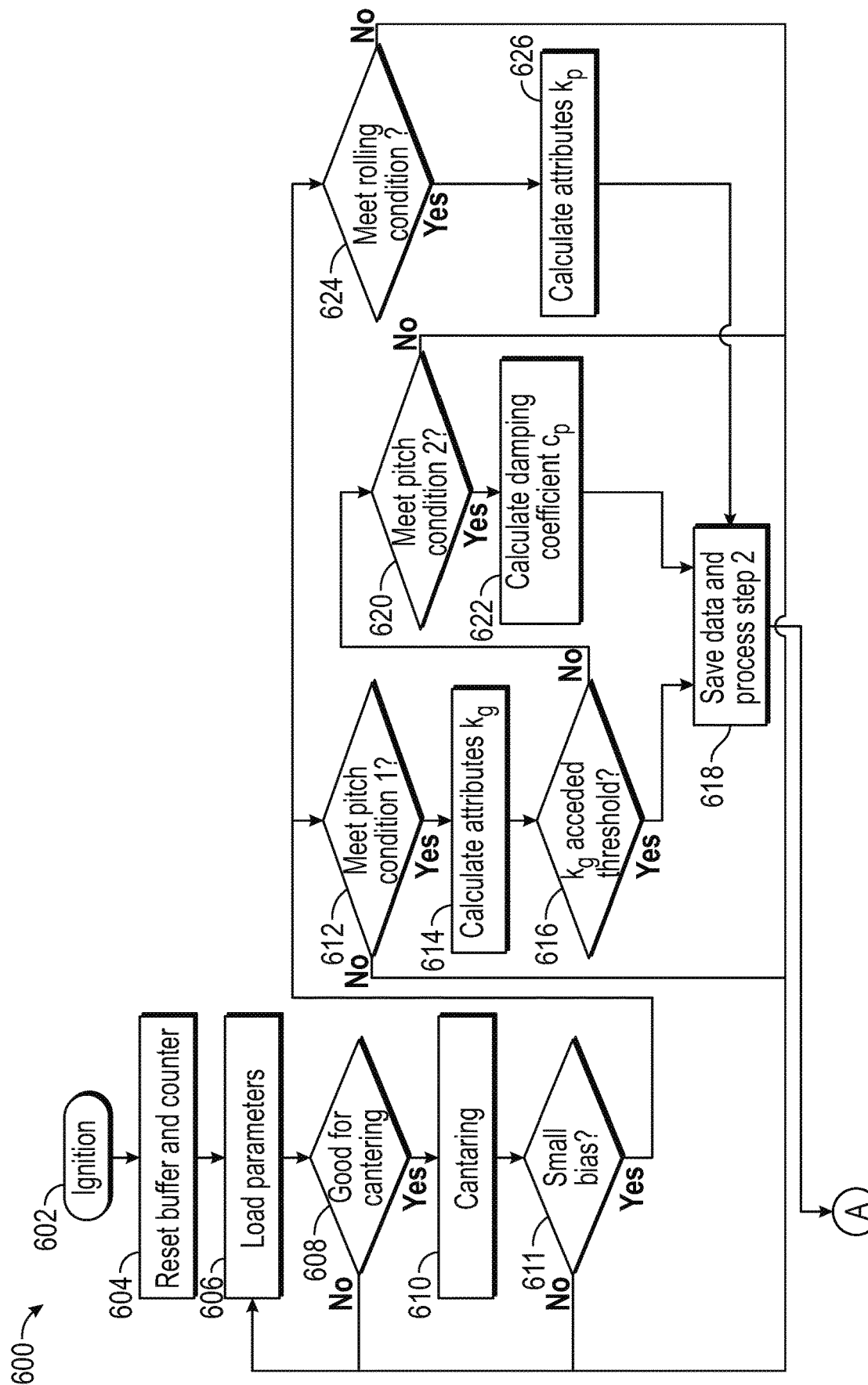
FIG. 6A and FIG. 6B (collectively referred to herein as FIG. 6) collectively comprise a flowchart (continuing over two pages, beginning with FIG. 6A and ending with FIG. 6B) of a suspension control process in which faults are diagnosed and predicted for a suspension system of a vehicle, and that can be implemented in connection with the vehicle and components of FIGS. 2-5, in accordance with various embodiments.
Figure 6B:
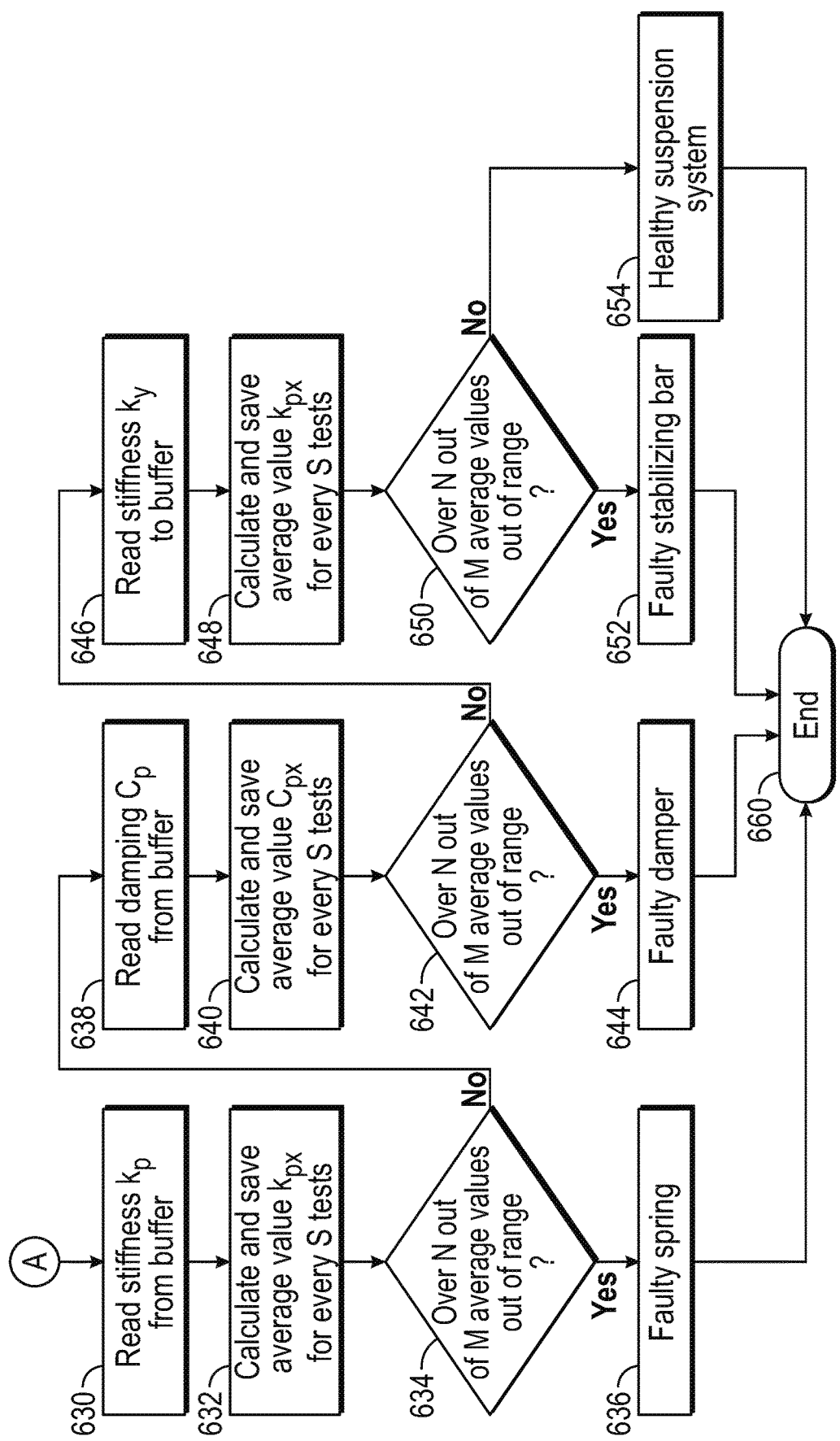

With reference to FIG. 6, a flowchart is provided for a control process 600 for diagnosing and predicting faults for a suspension system of a vehicle, in accordance with exemplary embodiments. In accordance with various embodiments, the control process 600 can be implemented in connection with the suspension control system 100 and vehicle 10 of FIG. 1, the transportation system 52 of FIG. 2, the autonomous driving system of FIG. 3, the suspension control system 400 of FIG. 4, and the suspension system of FIG. 5.

As can be appreciated in light of the disclosure, the order of operation within the control process 600 is not limited to the sequential execution as illustrated in FIG. 6, but may be performed in one or more varying orders as applicable and in accordance with the present disclosure. In various embodiments, the control process 600 can be scheduled to run based on one or more predetermined events, and/or can run continuously during operation of the vehicle 10. In addition, while the process 600 is depicted in FIG. 6 and described herein with respect to checking multiple components of the suspension system, it will be appreciated that in other embodiments the process 600 may vary, for example in that in certain embodiments the process 600 may focus on a single component (for example, a spring) and therefor that in such embodiments a subset of steps of the process 600 may only be needed, and so on, among other possible variations.

The process 600 of FIG. 6 will also be discussed further below with reference to FIGS. 7 and 8, which illustrate exemplary implementations of the process 600 in certain embodiments. Specifically, 7 depicts an exemplary illustration of the vehicle and the suspension system, showing parameters use for calculating a pitch stiffness coefficient and pitch damping coefficient using the lateral acceleration in certain steps of the process 600, in certain embodiments. FIG. 8 depicts an exemplary illustration of the vehicle and the suspension system, showing parameters use for calculating the pitch damping coefficient using the longitudinal acceleration in certain steps of the process 600, in certain embodiments.

With reference back to FIG. 6, in various embodiments the control process 500 may begin at 602. In various embodiments, process step 602 occurs when an occupant is within the vehicle 10 and the vehicle 10 begins operation in an automated or non-automated manner (e.g., in certain embodiments, when an ignition of the vehicle 10 is turned on or activated).

In various embodiments, a buffer and counter for the control process are re-set at step 604. Specifically, in various embodiments, a buffer and counter are used for fault determinations for the suspension system throughout the process (as described below) each time the process 600 is run, and are re-set at the beginning of the process 600 by the processor 44 of FIG. 1 at step 604.

Sensor data is obtained at 606. In various embodiments, sensor data is obtained from the various sensors 40a . . . 40n of FIG. 1, including sensors 40 of the inertial measurement unit 29 of FIG. 1. In various embodiments, the sensor data pertains to measured values as to lateral acceleration, longitudinal acceleration, pitch angle, and roll angle, angle, and/or related values (e.g., as to rates of change thereof, and so on). In certain embodiments, the sensor data includes the various measured values. In certain other embodiments, for some of the parameters, the sensor data includes related values. For example, in certain embodiments, the sensor data includes measured values of pitch rate and/or pitch acceleration, which can then be used by a processor to obtain pitch angle (e.g., by integrating the pitch rate). By way of additional example, also in certain embodiments, the sensor data includes measured values of roll rate and/or roll acceleration, which can then be used by a processor to obtain roll angle (e.g., by integrating the roll rate), and so on. Also in various embodiments, the sensor data is obtained continuously throughout the process 600, including under specified conditions as described below for the various measurements, and the measurements are utilized as parameters for a pitch model and a roll model that are used for diagnosing and predicting faults in the suspension system for the vehicle 10 (also as described in greater detail further below).

In various embodiments, one or more determinations are made at step 608 as to whether conditions are appropriate for performing a centering maneuver for the vehicle 10. In various embodiments, the processor 44 of FIG. 1 makes these determinations, based at least in part on current movement of the vehicle. For example, in certain embodiments, a centering maneuver is appropriate when the vehicle is relatively still and/or in a steady state condition (e.g., when parked or at a stop sign or stop light, and so on). In certain embodiments, the centering maneuver is deemed to be appropriate when each of the following conditions are met, namely: (i) a maximum value of absolute value for the pitch angle p for the vehicle is less than a first predetermined threshold (e.g., 0.5 degrees per second, in one embodiment); (ii) a maximum value of absolute value for the lateral acceleration $a_x$ for the vehicle is less than a second predetermined threshold (e.g., 0.2 meters per seconds squared, in one embodiment); (iii) a mean value for absolute value for the lateral acceleration $a_x$ for the vehicle is less than a third predetermined threshold (e.g., 0.1 meters per seconds squared, in one embodiment); (iv) a maximum value of absolute value for the yaw rate $\dot{\varphi}$ is less than a fourth predetermined threshold (e.g., one degree per second, in one embodiment); (v) a maximum value of absolute value for the roll rate $\dot{\psi}$ for the vehicle is less than a fifth predetermined threshold (e.g., 0.8 meters per seconds squared, in one embodiment); and (vi) a mean value for absolute value for the roll rate $\dot{\psi}$ is less than a sixth predetermined threshold (e.g., 0.5 meters per seconds squared, in one embodiment). In various embodiments, the "maximum" or "mean" values refer to maximum or mean values within a recent predetermined amount of time. In one embodiment, the maximum and values are in the several second range (e.g., about equal to three seconds, in one embodiment); however, this may vary in other embodiments. Also in various embodiments, different thresholds may be used for the respective values.

If it is determined in step 608 that conditions are not appropriate for performing a centering maneuver for the vehicle, then the process returns to step 606. In various embodiments, steps 606-610 continue in various embodiments until there is a determination in an iteration of step 608 that continues are appropriate for performing a centering maneuver for the vehicle.

Once it is determined that conditions are appropriate for performing a centering maneuver, centering is performed at step 610. In various embodiments, the vehicle 10 is centered with respect to its steering system 24 of FIG. 1, in accordance with instructions provided by the processor 44 of FIG. 1. In various embodiments, sensor data of step 606 continues to be collected after the vehicle is centered at step 610.

Determinations are made at step 611 as to whether measures of bias are less than respective predetermined thresholds. In various embodiments, the processor 44 of FIG. 1 makes these determinations based on various measures of bias in the above-mentioned parameters. In certain embodiments, determinations are made as to whether: (i) an absolute value of a measure of bias in pitch rate $\dot{p}$ is less than a seventh threshold (e.g., 0.6 degrees per second, in one embodiment); (ii) an absolute value of a measure of bias in lateral acceleration x is less than an eighth threshold (e.g., 0.3 meters per second squared, in one embodiment); (iii) an absolute value of a measure of bias in yaw rate $\dot{\varphi}$ is less than a ninth predetermined threshold (e.g., 0.5 degrees per second, in one embodiment); and (iv) an absolute value for a measure of bias in roll rate $\dot{\psi}$ is less than a tenth predetermined threshold (e.g., 0.3 meters per seconds squared, in one embodiment). In various embodiments, different thresholds may be used for the respective values.

If it is determined in step 611 that one or more of the measures of bias are not less than their respective thresholds, then the process returns to step 606. In various embodiments, steps 606-611 continue in various embodiments until there is a determination in an iteration of step 611 that the measures of bias are each less than their respective thresholds.

Once it is determined that each of the measures of bias of step 611 are less than their respective thresholds, then the process proceeds to both steps 612 (described directly below) and also to step 624 (described further below).

During step 612, determinations are made as to whether a first set of pitch conditions are satisfied for the purposes of calculating a pitch stiffness coefficient $K_p$. In various embodiments, the processor 44 of FIG. 1 makes these determinations based on the following determinations as to whether: (i) an acceleration event is occurring, as determined by whether a maximum value of absolute value of lateral acceleration $a_x$ is greater than a respective predetermined threshold (e.g., 1.5 meters per second squared, in one embodiment); (ii) an absolute value of the mean pitch rate $\dot{p}$ is less than a respective threshold (e.g., 0.08 degrees per second, in one embodiment); (iii) an absolute value of the mean pitch acceleration $\ddot{p}$ is less than a respective threshold (e.g., 0.05 degrees per second squared, in one embodiment); (iv) an absolute value of the quotient of the range of the pitch p divided by the mean of the pitch p is less than a respective threshold (e.g., 0.15, in one embodiment); (v) an absolute value of the quotient of the range of the lateral acceleration $a_x$ divided by the mean of the lateral acceleration $a_x$ is less than a respective threshold (e.g., 0.15, in one embodiment); and (vi) an absolute value of the mean of the lateral acceleration $a_x$ is greater than a respective threshold (e.g., 1.13 meters per second squared, in one embodiment).

If it is determined in step 612 that one or more of the first set of pitch conditions are not satisfied, then the process returns to step 606. In various embodiments, steps 606-612 continue in various embodiments until there is a determination in an iteration of step 612 that the first set of pitch conditions are satisfied.

Once it is determined that each of the first set of pitch conditions are satisfied, the pitch stiffness coefficient $K_p$ is calculated at step 616 using a pitch model. In various embodiments, the processor 44 of FIG. 1 calculates the pitch stiffness coefficient $K_p$ in accordance with the following equation:

$$K_p = (M_s h \cdot \text{mean}(a_x))/\text{mean}(\dot{\theta}_p) \qquad \text{(Equation 1)},$$

in which $a_x$ represents longitudinal acceleration and $\dot{\theta}_p$ represents pitch angle, respectively, in steady state, and in which h represents a height between a center of gravity of the vehicle 10 and a roadway on which the vehicle 10 is travelling.

Figure 7:
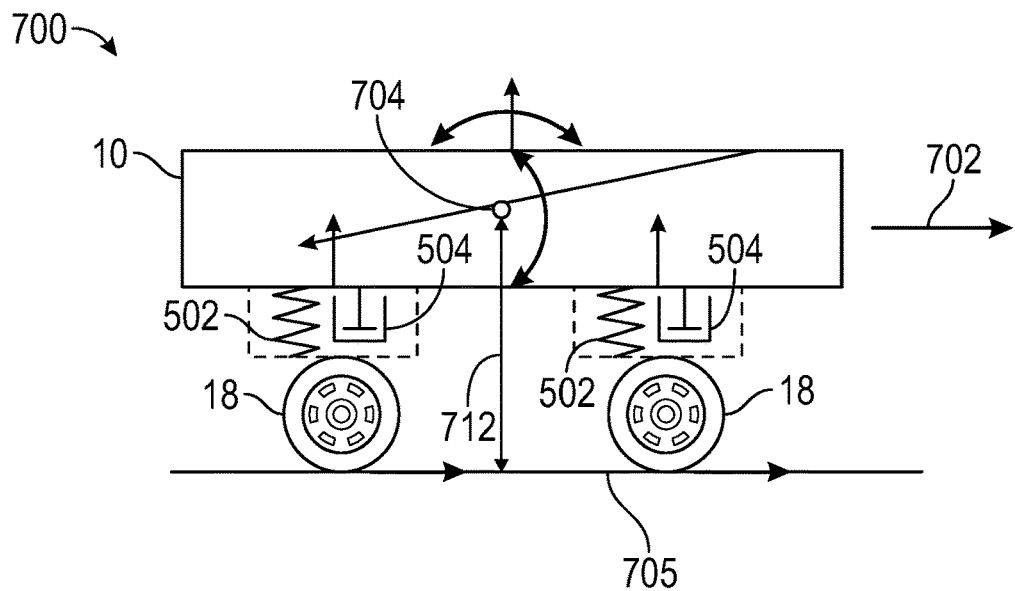
FIGS. 7 and 8 are illustrations of exemplary implementations of certain steps of the control process of FIG. 6, in accordance with exemplary embodiments.
Figure 8:
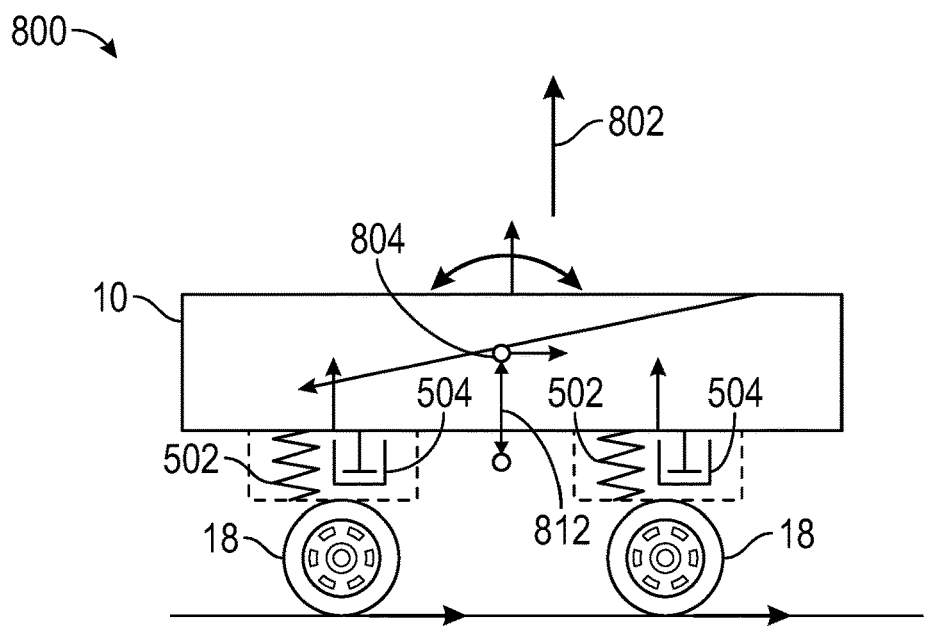

With reference to FIG. 7, in various embodiments, the pitch stiffness coefficient $K_p$ is calculated in this manner while the vehicle 10 has a forward 702 direction of travel, with a center of gravity 704 that is disposed a height (h) 712 above the roadway 705, in various embodiments.

In various embodiments, a determination is made in step 616 as to whether the pitch stiffness coefficient $K_p$ exceeds a predetermined threshold. In various embodiments, this determination is made by the processor 44 of FIG. 1. In one embodiment, this predetermined threshold is equal to 300,000; however, this may vary in other embodiments. Also in certain embodiments, the determination is whether the first pitch stiffness coefficient $K_p$ is greater that the predetermined threshold (e.g., 300,000 in one embodiment) while also being less than a second predetermined threshold (e.g., 100,000 in one embodiment); however, this may vary in other embodiments.

If it is determined that the pitch stiffness coefficient $K_p$ exceeds the predetermined threshold (or, in certain embodiments, if it is determined that the pitch stiffness coefficient $K_p$ exceeds the predetermined threshold while also being less than a second predetermined threshold), then the process proceeds to step 618 (described further below). Conversely, if it is determined that the pitch stiffness coefficient $K_p$ does not exceed the predetermined threshold, then the process proceeds instead to step 620 (described directly below).

During step 620, determinations are made at step 620 as to whether a second set of pitch conditions are satisfied for the purposes of calculating a pitch damping coefficient $C_p$. In various embodiments, the processor 44 of FIG. 1 makes these determinations based on the following determinations as to whether: (i) a current pitch rate $\dot{p}$ between ten percent and eighty percent of an average pitch rate $\dot{p}$ in steady state; (ii) an ending longitudinal acceleration $a_x$ during a current time interval is greater than a respective predetermined threshold (e.g., 1.5 meters per second squared, in one embodiment); (iii) a measure of an ending longitudinal acceleration $a_x$ minus a beginning longitudinal acceleration $a_x$ during the current time interval, divided by the length of the time interval times one hundred, is greater than a respective threshold (e.g., 1.5 meters per second squared, in one example); and (iv) a minimum value of the pitch rate $\dot{p}$ during the current time interval is greater than a respective predetermined threshold (e.g., 0.01 degrees per second, in one embodiment).

If it is determined in step 620 that one or more of the second set of pitch conditions are not satisfied, then the process returns to step 606. In various embodiments, steps 606-620 continue in various embodiments until there is a determination in an iteration of step 620 that the second set of pitch conditions are satisfied.

Once it is determined that each of the second set of pitch conditions are satisfied, the pitch damping coefficient $C_p$ is calculated at step 622 using a pitch model. In various embodiments, the processor 44 of FIG. 1 calculates the pitch damping coefficient $C_p$ in accordance with the following equation:

$$I_y \ddot{\theta}_p + C_p \dot{\theta}_p + k_p \theta_p = M_s h a_x \qquad \text{(Equation 2),}$$

using a Polyfit in accordance with the following equation:

$$y = C_p x \qquad \text{(Equation 3),}$$

in which:

$$y = M_s h a_x - I_y \ddot{\theta}_p - K_p \theta_p \qquad \text{(Equation 4),}$$

$$x = \dot{\theta}_p \qquad \text{(Equation 5), and}$$

$K_p$ is calculated in accordance with Equation (1) above.

With reference to FIG. 7, in various embodiments, the pitch damping coefficient $C_p$ is also calculated in this manner while the vehicle 10 has a forward 702 direction of travel as depicted in FIG. 7 (e.g., corresponding to straight ahead or forward travel), with a center of gravity 704 that is disposed a height (h) 712 above the roadway 705, in various embodiments.

In various embodiments, then the process proceeds to step 618 (described further below).

With reference back to step 611, once the it is determined that each of the measures of bias of step 611 are less than their respective thresholds, then the process proceeds to step 624 (described directly below) in addition to steps 612-622 (described above).

During step 624, determinations are made as to whether a set of rolling conditions satisfied for the purposes of calculating a roll stiffness coefficient $K_r$. In various embodiments, the processor 44 of FIG. 1 makes these determinations based on the following determinations as to whether: (i) an absolute value of the mean of the yaw rate $\dot{\varphi}$ is less than a respective predetermined threshold (e.g., 0.08 degrees per second, in one embodiment); (ii) an absolute value of the mean of the yaw acceleration $\ddot{\varphi}$ is less than a respective predetermined threshold (e.g., 0.05 degrees per second, in one embodiment); (iii) an absolute value of the quotient of the yaw range divided by the yaw mean is less than a respective predetermined threshold (e.g., 0.15, in one embodiment); (iv) an absolute value of the quotient of the lateral acceleration range divided by the lateral acceleration mean is greater than a respective predetermined threshold (e.g., 1.32 meters per second squared, in one embodiment).

If it is determined in step 624 that one or more of the roll conditions are not satisfied, then the process returns to step 606. In various embodiments, steps 606-624 continue in various embodiments until there is a determination in an iteration of step 624 that the roll conditions are satisfied.

Once it is determined that the roll conditions are satisfied, the roll stiffness coefficient $K_r$ is calculated at step 628 using a roll model. In various embodiments, the processor 44 of FIG. 1 calculates the roll stiffness coefficient $K_r$ in accordance with the following equation:

$$K_r = (M_s h^* \text{mean}(a_y)) / (\text{mean } \varphi) \qquad \text{(Equation 6),}$$

in which $a_y$ and $\varphi$ represent values in steady state.

With reference to FIG. 8, in various embodiments, the roll stiffness coefficient $K_r$ is calculated in this manner while the vehicle 10 has a forward 802 direction of travel as depicted in FIG. 8 (e.g., corresponding to a turn left or right), with a center of gravity 804 and a height $h_s$ 812 as depicted in FIG. 8. In various embodiments, $H_s$ is a predefined parameter indicating a distance between the center of gravity $c_g$ and the roll center.

In various embodiments, then the process proceeds to step 618, described directly below.

During step 618, the various coefficient values of steps 616, 622, and 626, along with the parameters utilized to calculate them, are stored in memory (such as the computer memory 46 of FIG. 1) for further processing. In various embodiments, these values are stored on a buffer via the memory 46.

Next, during steps 630-654, various determinations are made, using the stored data, to determine and/or predict faults in the suspension system.

In various embodiments, during step 630, the pitch stiffness coefficient $K_p$ is read from the buffer. Also in various embodiments, average values of the pitch stiffness coefficient $K_p$ are calculated over a number of points in time (step 632). It will be appreciated that the number of points in time (and therefor the number of times the pitch stiffness coefficient $K_p$ is calculated) may vary in different embodiments. In various embodiments, these steps are performed by the processor 44 of FIG. 1.

Also in various embodiments, a determination is made during step 634 as to whether the average values of the pitch stiffness coefficient $K_p$ have exceeded a predetermined threshold in at least "M" out of "N" iterations. For example, in one embodiment, a determination is made by the processor 44 of FIG. 1 as to whether the pitch stiffness coefficient $K_p$ has exceeded a predetermined threshold in at least three (e.g., in which "M"=3) out of five (e.g., in which "N"=5) iterations. However, the values of "M" and "N" may vary in different embodiments. In one embodiment, this predetermined threshold is equal to 220,000; however, this may vary in other embodiments. Also in certain embodiments, the determination is whether the pitch stiffness coefficient $K_p$ is greater that the predetermined threshold (e.g., 220,000 in one embodiment) while also being less than a second predetermined threshold (e.g., 170,000 in one embodiment) in at least "M" out of "N" iterations; however, this may vary in other embodiments.

If it is determined that the average values of the pitch stiffness coefficient $K_p$ have exceeded a predetermined threshold (e.g., 220,000 in one embodiment) in at least "M" out of "N" iterations (i.e., "yes"), then a determination is made in step 636 that the suspension system has a faulty spring. In certain embodiment, the determination is also made that the suspension has a faulty spring if the average values of the pitch stiffness coefficient $K_p$ are less than the second predetermined threshold (e.g., 170,000 in one embodiment) in at least "M" out of "N" iterations. In certain embodiments, the determination is made that the suspension has a faulty spring if the average values of the pitch stiffness coefficient $K_p$ have exceeded a predetermined threshold (e.g., 220,000 in one embodiment) while also being less than the second predetermined threshold (e.g., 170,000 in one embodiment) in at least "M" out of "N" iterations. In certain embodiments, in these situations, the processor 44 of FIG. 1 may provide instructions for one or more control actions (e.g., recommending a repair for the spring, or making a modification to the suspension system, or performing one or more other checks and/or repairs of damage). In certain embodiments, the process then terminates at step 660.

Conversely, if it is determined that the criteria for step 636 (provided above) are not satisfied with respect to the average values of the pitch stiffness coefficient $K_p$ in at least "M" out of "N" iterations (i.e., "no"), then the process proceeds instead to step 638, described directly below.

In various embodiments, during step 638, the pitch damping coefficient $C_p$ is read from the buffer. Also in various embodiments, average values of the pitch damping coefficient $C_p$ are calculated over a number of points in time (step 640). It will be appreciated that the number of points in time (and therefor the number of times the pitch damping coefficient $C_p$ is calculated) may vary in different embodiments. In various embodiments, these steps are performed by the processor 44 of FIG. 1.

Also in various embodiments, a determination is made during step 642 as to whether the average values of the pitch damping coefficient $C_p$ has been less than a predetermined threshold (e.g., 19,000 in one embodiment) in at least "M" out of "N" iterations. For example, in one embodiment, a determination is made by the processor 44 of FIG. 1 as to whether the pitch damping coefficient $C_p$ has been less than a predetermined threshold in at least three (e.g., in which "M"=3) out of five (e.g., in which "N"=5) iterations. However, the values of "M" and "N" may vary in different embodiments. In addition, the predetermined threshold for the pitch damping coefficient $C_p$ may also vary in different embodiments.

If it is determined that the average values of the pitch damping coefficient $C_p$ have been less than a predetermined threshold (e.g., 19,000 in one embodiment) in at least "M" out of "N" iterations (i.e., "yes"), then a determination is made in step 644 that the suspension system has a faulty damper. In certain embodiments, in this situation, the processor 44 of FIG. 1 may provide instructions for one or more control actions (e.g., recommending a repair for the damper, or making a modification to the suspension system). In certain embodiments, the process then terminates at step 660.

Conversely, if it is determined that the average values of the pitch damping coefficient $C_p$ have not been less than a predetermined threshold in at least "M" out of "N" iterations (i.e., "no"), then the process proceeds instead to step 646, described directly below.

In various embodiments, during step 646, the roll stiffness coefficient $K_r$ is read from the buffer. Also in various embodiments, average values of the roll stiffness coefficient $K_r$ are calculated over a number of points in time (step 648). It will be appreciated that the number of points in time (and therefor the number of times the roll stiffness coefficient $K_r$ is calculated) may vary in different embodiments. In various embodiments, these steps are performed by the processor 44 of FIG. 1.

Also in various embodiments, a determination is made during step 650 as to whether the average values of the roll stiffness coefficient $K_r$ has been less than a predetermined threshold (e.g., 70,000 in one embodiment) in at least "M" out of "N" iterations. For example, in one embodiment, a determination is made by the processor 44 of FIG. 1 as to whether the roll stiffness coefficient $K_r$ has been less than a predetermined threshold in at least three (e.g., in which "M"=3) out of five (e.g., in which "N"=5) iterations. However, the values of "M" and "N" may vary in different embodiments. In addition, the predetermined threshold for the roll stiffness coefficient $K_r$ may also vary in different embodiments. In one exemplary embodiment, this threshold is equal to 70,000; however, this may vary in other embodiments.

If it is determined that the average values of the roll stiffness coefficient $K_r$ have been less than a predetermined threshold in at least "M" out of "N" iterations (i.e., "yes"), then a determination is made in step 652 that the suspension system has a faulty stabilizing bar. In certain embodiments, in this situation, the processor 44 of FIG. 1 may provide instructions for one or more control actions (e.g., recommending a repair for the stabilizing bar, making a modification to the suspension system, and/or performing a check and/or repair for the bar link and/or bushing). In certain embodiments, the process then terminates at step 660.

Conversely, if it is determined that the average values of the roll stiffness coefficient $K_r$ have not been less than a predetermined threshold in at least "M" out of "N" iterations (i.e., "no"), then a determination is made that the suspension system is in a healthy state at step 654. In certain embodiments, the process then terminates at step 660.

Also, as noted above, while the process 600 is depicted in FIG. 6 and described herein with respect to checking multiple components of the suspension system, it will be appreciated that in other embodiments the process 600 may vary, for example in that in certain embodiments the process 600 may focus on a single component (for example, a spring), and therefor that in such embodiments a subset of steps of the process 600 may only be needed, and so on, among other possible variations. For example, in one embodiment in which a determination is only to be provided with respect to a spring, there may only be a need to calculate Kp and compare Kp with thresholds, and then determine if the spring is health based on whether the Kp value is within a healthy range (e.g., the spring is determined to be healthy if Kp is within the range, and is determined to be unhealth if Kp is out of range). In such an embodiment, there would be no need to calculate Cp and Kr, or compare them with thresholds, by way of example in one embodiment.

Accordingly, in various embodiments, methods, systems, and vehicles are provided that provide for fault detection and prognosis for suspension systems of vehicles. In various embodiments, pitch and roll models are utilized for calculating stiffness and damping coefficients under different conditions, and the parameters are used to diagnose faults in the suspension system.

It will be appreciated that, in various embodiments, the vehicles, systems, and components depicted in the drawings and described above may vary. It will similarly be appreciated that the steps, implementations, and examples depicted in the drawings and described above may also vary, and/or may be performed in a different order or sequence, and so on.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method for determining a fault in a suspension system of a vehicle, the method comprising:
    obtaining sensor data via one or more vehicle sensors during operation of the vehicle as the vehicle is centered via instructions by a processor while the vehicle is in a steady state of operation;
    calculating, via the processor, a pitch stiffness coefficient for the vehicle, using a pitch model with the sensor data, including an average longitudinal acceleration, an average pitch angle, and a height between a center of gravity of the vehicle and a roadway on which the vehicle is travelling while the vehicle is in the steady state of operation;
    calculating, via the processor, a roll stiffness coefficient for the vehicle, using a roll model with the sensor data, including an average latitudinal acceleration, an average yaw rate, and the height between the center of gravity of the vehicle and the roadway on which the vehicle is travelling while the vehicle in in the steady state of operation; and
    determining, via the processor, the fault in the suspension system using the pitch stiffness coefficient and the roll stiffness coefficient, wherein the step of determining the fault comprises:
        determining a fault in a spring of the suspension system, when the pitch stiffness coefficient exceeds a first predetermined threshold; and
        determining a fault in a stabilizing bar of the suspension system, when the roll stiffness coefficient is less than a second predetermined threshold.

2. The method of claim 1, further comprising:
    calculating, via the processor, a pitch damping coefficient for the vehicle, using the pitch model with the sensor data, including a current value of pitch rate, an ending longitudinal acceleration during a current time interval, a difference between the ending longitudinal acceleration and a beginning longitudinal acceleration during the current time interval, and a minimum value of pitch rate during the current time interval;
    wherein the step of determining the fault further comprises determining a fault in a damper of the suspension system, when the pitch damping coefficient is less than a third predetermined threshold.

3. A system comprising:
    one or more sensors configured to generate sensor data during operation of a vehicle during operation of the vehicle as the vehicle is centered via instructions by a processor while the vehicle is in a steady state of operation; and
    a processor coupled to the sensors and configured to at least facilitate:
        calculating a pitch stiffness coefficient for the vehicle, using a pitch model with the sensor data, including an average longitudinal acceleration, an average pitch angle, and a height between a center of gravity of the vehicle and a roadway on which the vehicle is travelling while the vehicle is in the steady state of operation;
        calculating a roll stiffness coefficient for the vehicle, using a roll model with the sensor data, including an average latitudinal acceleration, an average yaw rate, and the height between the center of gravity of the vehicle and the roadway on which the vehicle is travelling while the vehicle in in the steady state of operation; and
        determining a fault in a suspension system of the vehicle using the pitch stiffness coefficient and the roll stiffness coefficient, wherein the fault in the suspension is determined via the processor by:
            determining a fault in a spring of the suspension system, when the pitch stiffness coefficient exceeds a first predetermined threshold; and
            determining a fault in a stabilizing bar of the suspension system, when the roll stiffness coefficient is less than a second predetermined threshold.

4. The system of claim 3, wherein the processor is further configured to at least facilitate:
    calculating a pitch damping coefficient for the vehicle, using the pitch model with the sensor data, including a current value of pitch rate, an ending longitudinal acceleration during a current time interval, a difference between the ending longitudinal acceleration and a beginning longitudinal acceleration during the current time interval, and a minimum value of pitch rate during the current time interval; and
    determining a fault in a damper of the suspension system, when the pitch damping coefficient is less than a third predetermined threshold.

5. A vehicle comprising:
    a suspension system;
    one or more sensors configured to generate sensor data during operation of the vehicle as the vehicle is centered via instructions by a processor while the vehicle is in a steady state of operation; and a processor coupled to the sensors and configured to at least facilitate:
    calculating a pitch stiffness coefficient for the vehicle, using a pitch model with the sensor data, including an average longitudinal acceleration, an average pitch angle, and a height between a center of gravity of the vehicle and a roadway on which the vehicle is travelling while the vehicle is in the steady state of operation;
    calculating one or more second coefficients a roll stiffness coefficient for the vehicle, using a roll model with the sensor data, including an average latitudinal acceleration, an average yaw rate, and the height between the center of gravity of the vehicle and the roadway on which the vehicle is travelling while the vehicle in in the steady state of operation; and
    determining a fault in a suspension system of the vehicle using the pitch stiffness coefficient and the roll stiffness coefficient, wherein the fault in the suspension is determined via the processor by:
        determining a fault in a spring of the suspension system, when the pitch stiffness coefficient exceeds a first predetermined threshold; and
        determining a fault in a stabilizing bar of the suspension system, when the roll stiffness coefficient is less than a second predetermined threshold.

6. The vehicle of claim 5, wherein the processor is further configured to at least facilitate:
    calculating a pitch damping coefficient for the vehicle, using the pitch model with the sensor data, including a current value of pitch rate, an ending longitudinal acceleration during a current time interval, a difference between the ending longitudinal acceleration and a beginning longitudinal acceleration during the current time interval, and a minimum value of pitch rate during the current time interval; and
    determining a fault in a damper of the suspension system, when the pitch damping coefficient is less than a third predetermined threshold.

\* \* \* \* \*